Aug. 16, 1966  E. SANTINELLI  3,266,368
DUAL RETICLE LENS TESTING APPARATUS
Filed July 19, 1965  6 Sheets-Sheet 1
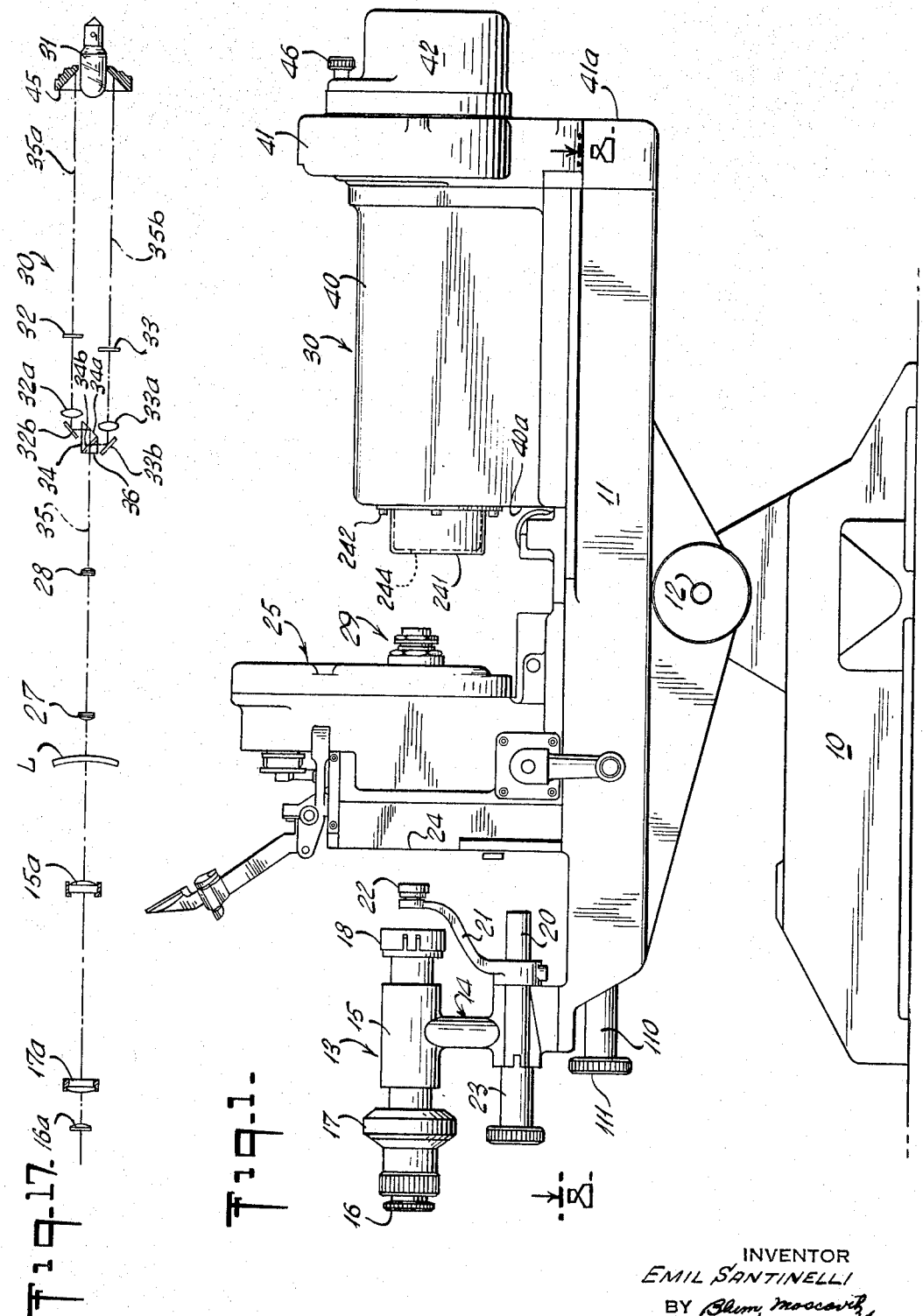
INVENTOR
EMIL SANTINELLI
BY Blum, Moscovitz,
Friedman, Blum & Kaplan
ATTORNEYS

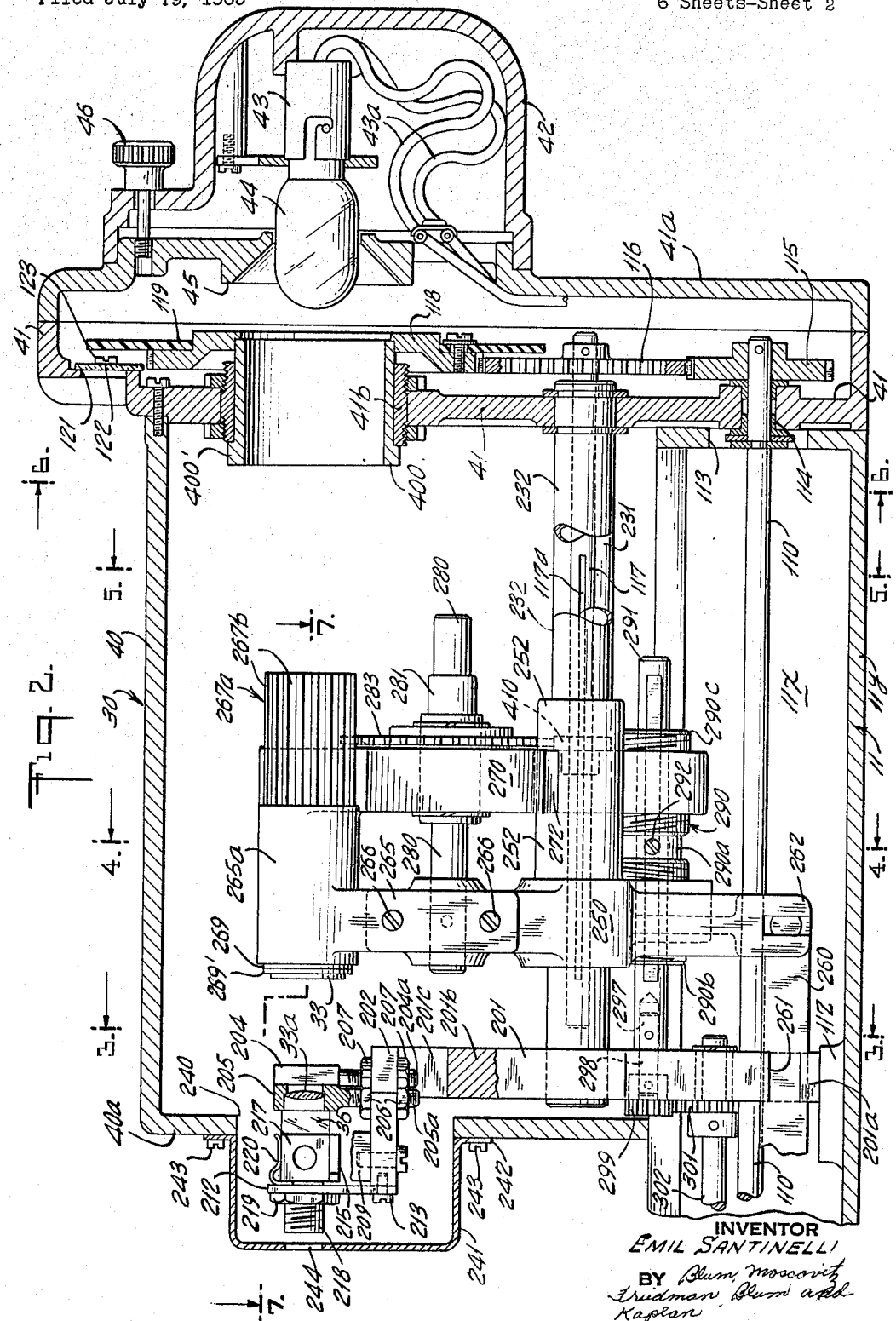

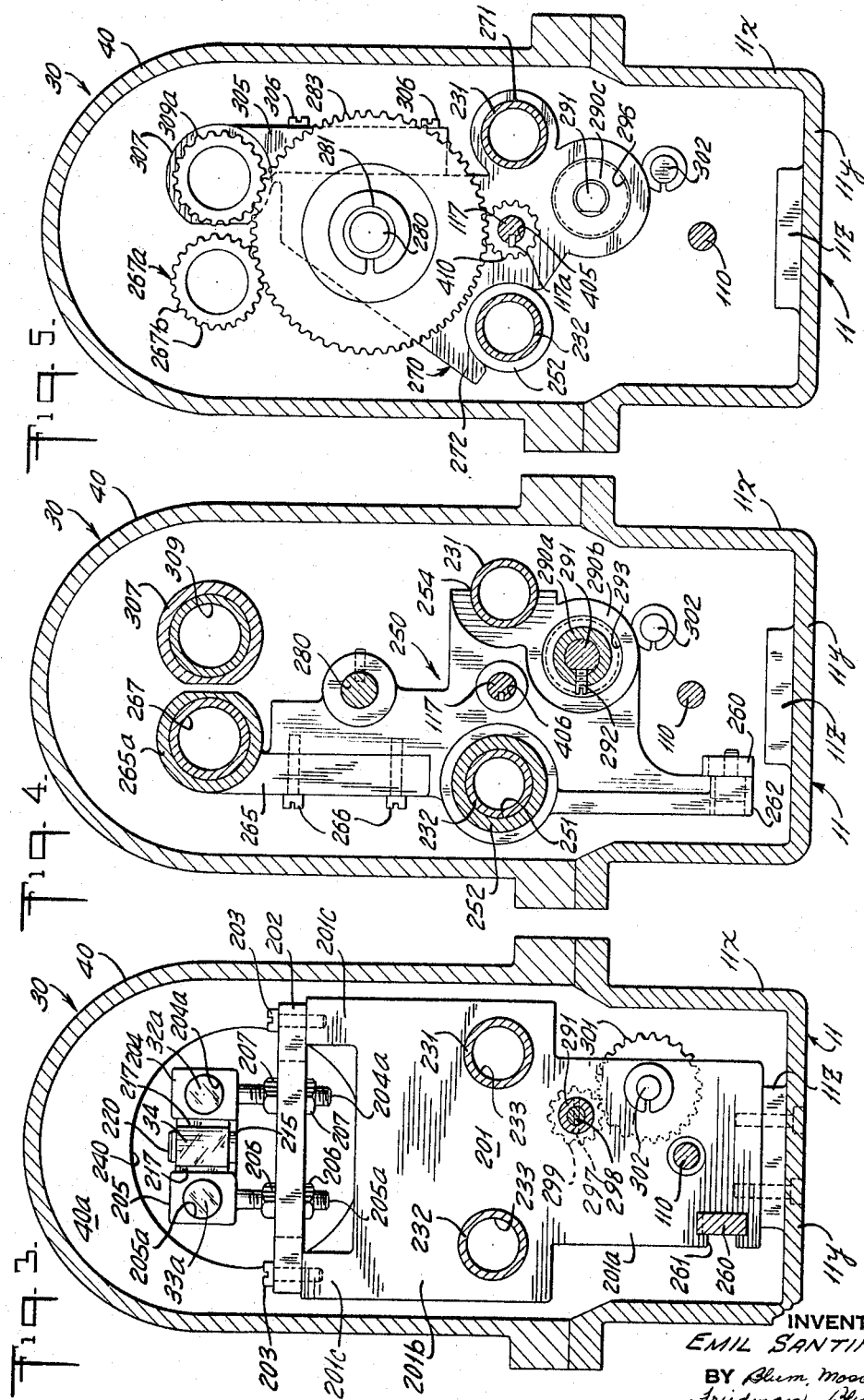

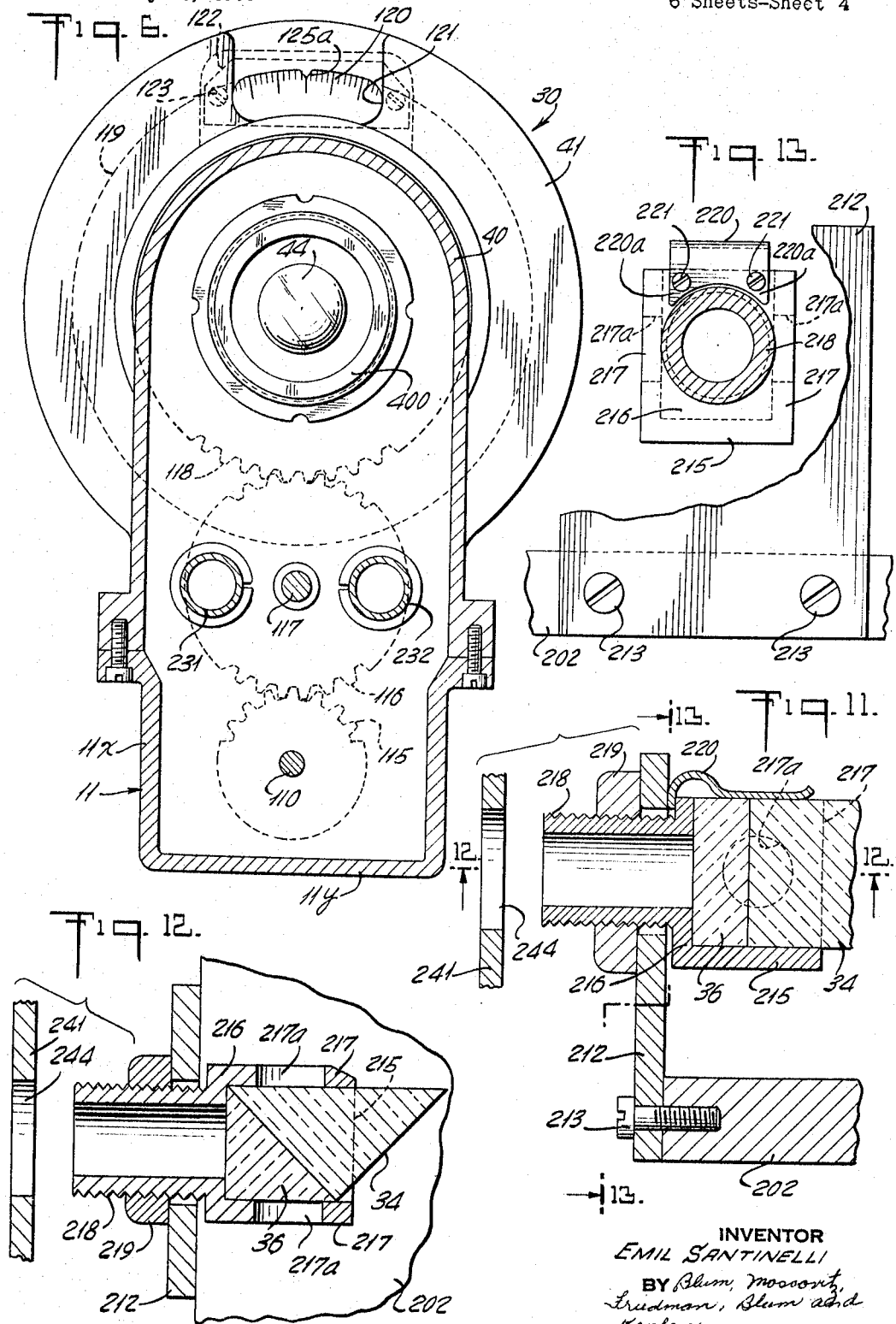

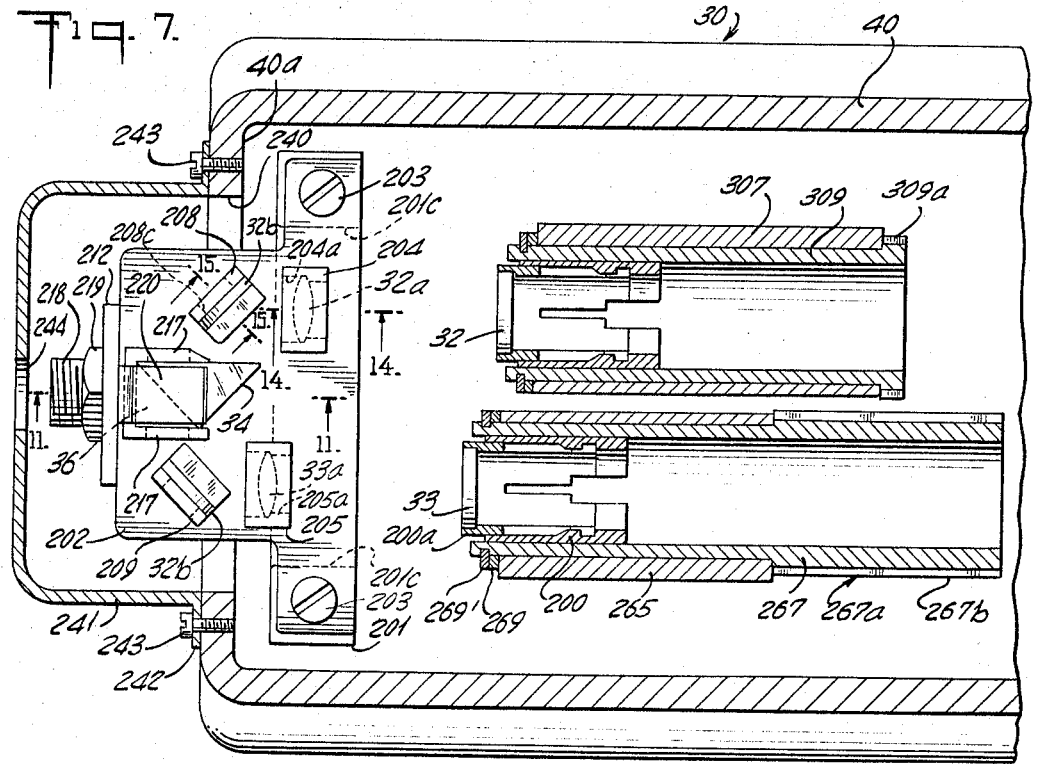
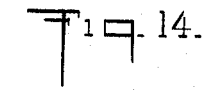
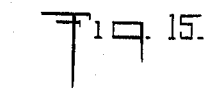
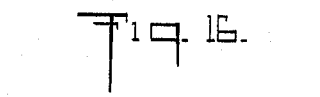
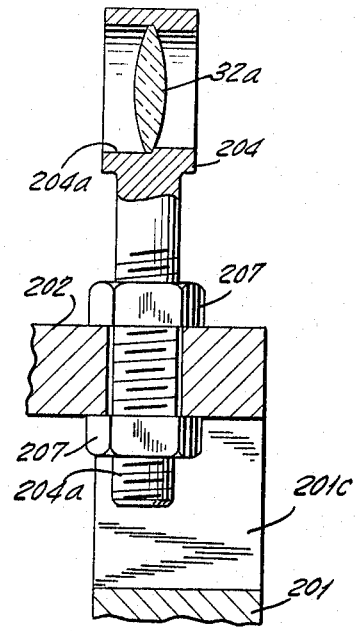
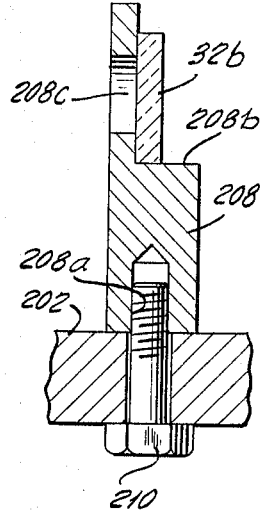
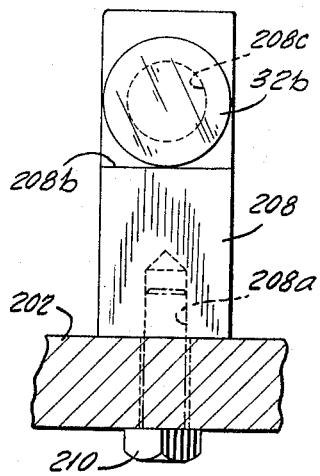

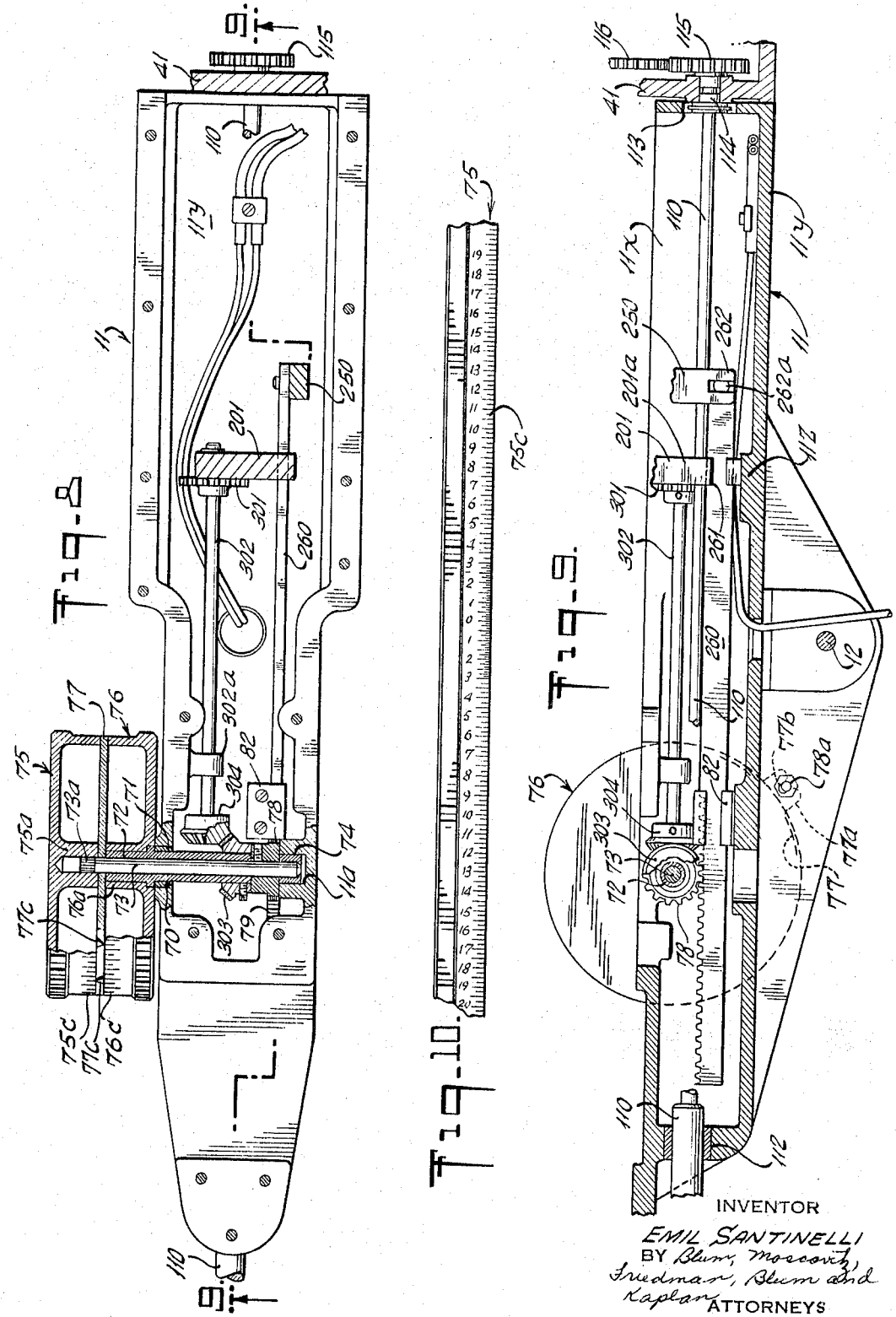

United States Patent Office 3,266,368
Patented August 16, 1966

3,266,368
DUAL RETICLE LENS TESTING APPARATUS
Emil Santinelli, Carmel, N.Y., assignor to Lemay Optical Corp., Carmel, N.Y., a corporation of New York
Filed July 19, 1965, Ser. No. 473,131
3 Claims. (Cl. 88—56)

This invention relates to an improved machine and optical system for testing lenses, particularly lenses of the type used in eyeglasses.

When the rough blank of a lens is received, it is necessary to check the lens to be certain that the optical powers along both axes are the same as marked on the package, and also to position the lens for marking it so that it may later be cut to the shape required for the particular eyeglass frame.

Of course, the machine can be used for testing any type of lens.

Generally speaking, in machines of this type, a lens is tested by projecting the images of two hairlines at right angles to each other through the lens and into an optical viewing system. For each hairline, the position to which the source of the image must be adjusted will depend upon the particular diopter of the lens or its particular magnification power with respect to that particular hairline. The horizontal line is the measure of the spherical power of the lens and that usually is adjusted first. The vertical line is the measure of the cylinder power of the lens and that usually has to be adjusted separately after the horizontal line has been adjusted. Where the two lines cross is the optical center of the lens, and it is important that this be determined accurately. Also, while the hairlines have been referred to as horizontal and vertical lines, it will be apparent that they may have to be turned out of the horizontal and vertical depending upon the exact prescription for the lens; and this must also be carried out accurately.

In the past, the lens would be placed in the machine and then an adjustment made so as to project properly the image of the horizontal hairline corresponding to the spherical power. Once this measurement was made, the adjustment for the image of the vertical hairline would then be made, but the two images could not be seen at the same time.

Since the images of the horizontal and vertical hairlines may not be seen at the same time in existing machines, it has been extremely difficult to determine the true optical center and an experienced worker was required who would in effect guess at the optical center.

In accordance with the present invention, the images of the horizontal and vertical hairlines are projected simultaneously through the lens to be tested into the optical viewing system. In this way, if the image of the horizontal hairline is adjusted until it is in focus and the image of the vertical hairline then adjusted, the image of the adjusted horizontal hairline remains in view during the adjustment of the vertical hairline. In the end, both of the hairlines are in focus and where they cross is the true optical center.

In the drawings,

FIG. 1 is a side elevation of the improved machine.

FIG. 2 is a vertical longitudinal section of the rear portion of the machine, which contains the projection system for the hairlines, in accordance with the invention.

FIGS. 3, 4, 5 and 6 are respectively transverse sections on lines 3—3, 4—4, 5—5, and 6—6 of FIG. 2.

FIG. 7 is a fragmentary plane section to an enlarged scale on lines 7—7 of FIG. 2.

FIG. 8 is a section on lines 8—8 of FIG. 1.

FIG. 9 is a section on lines 9—9 of FIG. 8.

FIG. 10 is a developed view of the adjustment knob.

FIG. 11 is an enlarged fragmentary section on lines 11—11 of FIG. 7.

FIG. 12 is a section on lines 12—12 of FIG. 11.

FIG. 13 is a section on lines 13—13 of FIG. 11.

FIG. 14 is a section on lines 14—14 of FIG. 7.

FIG. 15 is a section on lines 15—15 of FIG. 7.

FIG. 16 is a side view of FIG. 15.

FIG. 17 is a diagrammatic optical view of the machine.

*General description*

As shown in FIG. 1, the entire machine is supported upon base 10, which may rest on any convenient horizontal surface. Main longitudinally extending frame 11 is attached to base 10 by means of lateral pivot 12 and overlies base 10.

At the front of the machine, frame 11 supports sub-frame 14, which extends above frame 11. Sub-frame 14 serves as part of the viewing assembly 13 and includes a longitudinally extending telescope 15 with a longitudinally adjustable eyepiece 16 and a vertical rotator 17 located between the telescope 15 and the eyepiece assembly 16. At the rear of the telescopic device 15 is a further lens holder 18 for use in increasing the overall magnification. The viewing assembly 13 is conventional and is not described in detail. Near the bottom of sub-frame 14, a shaft 20 is extended through a longitudinal bore and carries an upstanding bracket 21 which carries at its upper rear end a lens clamp 22. Plunger 23 on the front of shaft 20 may be used to push the lens clamp 22 rearwardly so as to clamp the lens against a glass grid 24. The lens clamping assembly is conventional and is not described in detail.

Grid 24 is mounted vertically upon the front of a lens holding and cutting assembly 25 which is mounted upon the top of main frame 11. This assembly 25 is of the type generally shown in U.S. Patent to Ray et al. No. 2,930,130. Accordingly, the assembly 25 is not described in detail. As is also conventional, the assembly 25 includes a longitudinally extending tube which carries adjustable lenses 27 and 28 (FIG. 17). These lenses 27 and 28 may be adjusted by means of the assembly 29 shown on the rear of the lens cutting and holding assembly 25. Reference is made to the aforesaid Patent No. 2,930,130 for the details of this particular sub-assembly.

At the rear, there is mounted upon frame 11 a dual reticle system 30 for independently projecting the images of the respective hairlines through the lenses 28 and 27 and the lens L clamped upon grid plate 24 and hence to the veiewing assembly 13.

*Optical diagram*

In order to understand the principle of construction of the reticle assembly 30, it is convenient first to refer to the optical diagram shown in FIG. 17. FIG. 17 shows, in longitudinal succession, along axis 35, the front adjustable eyepiece lens 16a contained in eyepiece 16, and shows the reticle 17a rotatably contained within the assembly 17. FIG. 17 further shows the adjustable objective lens 15a in the telescope assembly 15. The optional lens which could be contained in holder 18 is not shown in FIG. 17. FIG. 17 further shows lens L to be tested and shows the subsidiary further lenses 27 and 28 referred to above.

Finally, at the rear, FIG. 17 shows diagrammatically the reticle assembly 30 referred to above. From rear to front, the assembly includes a source of light 31 which is projected by any suitable means in the direction of laterally spaced, longitudinally extending axes 35a and 35b through the respective reticles 32 and 33. Reticle 32 may have the vertical hairline for the cylinder reading and reticle 33 may have the horizontal line for the spherical reading. Means are provided to rotate reticles 32 and 33 if it is desired to incline the lines of reticles 32 and 33 angularly from the vertical and horizontal respectively. The optical system further includes focusing lenses 32a and 33a respectively for the reticles 32 and 33, these lenses 32a and 33a being not adjustable during use of the machine. The light of reticle 32 is projected upon mirror 32b which is inclined at 45° in the manner shown in FIG. 17. The light of reticle 33 is projected upon mirror 33b which is opositely inclined at 45°. Mirror block 34 is of triangular shape in horizontal longitudinal section and has a rear surface 34a inclined at 45° and opposing the mirror 32b and fully aluminized so as to reflect the light of reticle 32 in the forward direction of axis 35. The front inclined surface 34b of mirror 34 is treated by conventional means to be a semi-mirror. In other words, the surface 34b reflects light forwardly from the mirror 33b, in the direction of axis 35, and in alignment with the light from surface 34a, but is permeable to the light reflected from the surface 34a. As a result, the light 35 which passes through the prism 36 in the front of mirror 34 contains the combined images of the horizontal and vertical hairlines.

Each of the reticles 32 and 33 is longitudinally adjustable so as to vary the focal length of the system containing each reticle and thereby focus the image thereof properly in accordance with the characteristics of the lens which is being tested.

*Detailed description*

On its upper rear, frame 11 supports a longitudinally extending housing 40. As shown in FIGS. 2–7, housing 40 is hollow and has a front wall 40a. The rear of housing 40 and of frame 11 are closed off by a separate housing assembly 41 which is also hollow and which has a peripheral wall and a rear wall 41a. The light housing or projector housing 42 is fixed to the rear of housing 41.

The housing portion of frame 11 which is overlaid by housing 40 is trough shaped, such trough being designated by the reference numeral 11x having a bottom wall 11y. Near the front of housing 40, a vertically and laterally extending heavy plate 201 extends upwardly from boss 11z upon bottom wall 11y, being rigidly secured thereto by any suitable means. Plate 201 has a lower portion 201a and an upper portion 201b of increased width. The upper part of plate 201b terminates in a pair of side projections 201c which receive the horizontal plate 202 which supports prism 34, mirrors 32b and 33b and lenses 32a and 33a. Plate 202 is fixed to the uper surfaces of the projections 201c by means of screws 203 extended through plate 202 and into the projection 201c.

Lens 32a is received in longitudinal aperture 204a of block 204 (FIG. 14 and other views). Lens 33a is received within longitudinal through aperture 205a of block 205. Screw shanks 205b and 204b respectively extend downwardly from the blocks 205 and 204, and extend through respective apertures in plate 202, being locked in place above and below plate 202 by respective nuts 206 and 207 screwed onto the shank. In this way, the vertical position, as well as the turned position around a vertical axis, of each lens 32a and 33a may be adjusted.

Mirror 32b is supported by block 208, and mirror 33b is supported by block 209. Only block 208 will be described, since the same description applies for both blocks. Block 208 (FIGS. 15 and 16 and other views) rests upon the top of plate 202 being secured thereto by means of a screw 210, the head of which bears against the bottom of the plate and the shank of which is threaded into a bore 208a extending upwardly from the bottom of block 208. The upper portion of block 208 is of reduced thickness so as to provide a rear shoulder 208b. Above shoulder 208b, block 208 has a through longitudinal aperture 208c. The mirror 32b overlies shoulder 208b and also overlies the aperture 208c and is fixed to the rear face of block 208. It will be apparent that the mirrors 32b and 32c may be apropriately turned about their vertical axes for adjustment purposes.

In order to support the elements 34 and 36, as shown in FIGS. 11–13 and other views, plate 212 is fixed to the front of plate 202, by means of screws 213, and extends upwardly therefrom. The prisms are received in a socket comprising bottom wall 215, apertured front wall 216 to which bottom wall 215 is fixed, and a pair of side walls 217 also fixed to wall 216 and having aligned side apertures 217a. A hollow longitudinal screw shank 218 is integral with the front wall 216 and extends through a suitable aperture in plate 212, being held in place by nut 219. The bore of tube 218 and aperture of wall 216 are aligned. Spring plate 220 overlies and completes the top of the socket, spring plate 220 having at its front ears 220a which are secured to the top edge of the front wall 216 by means of screws 221. The plate 220 is of less width than the distance between the side walls 217. The prisms 36 and 34, in the arrangement shown in FIG. 17 are received within the socket resting upon the bottom wall 215. The spring plate 220 bears frictionally against the tops of the two prisms to hold them in place. It will be apparent, accordingly, that the longitudinal position of the prisms may be adjusted.

The front housing wall 40a has an opening 240, over the front of which is placed a cylindrical cap 241 having an out-turned flange 242 secured to the front of the housing by screws 243 (FIG. 2 and other views). The cap 241 has an opening 244 which is aligned with the bore shank 218 so that the beam of light can extend forwardly from the reticle assembly to the forward optical portions of the machine.

Lefthand and righthand (as viewed looking toward the front of the machine) longitudinal shafts 231 and 232 are respectively fixed in apertures 233 in plate 201 and extend rearwardly thereof. The front ends of the shafts 231 and 232 are received in any suitable apertures in the front wall of housing 41, as shown in FIG. 2. The heavy and optionally hollow shafts serve as supports for the reticles to permit the desired movements thereof.

Vertically and laterally extending casting 250 is supported by shafts 231 and 232, particularly shaft 232, for longitudinal sliding movement. Specifically, the casting 250 has a bore 251 through which shaft 232 extends slidably, and a sleeve 252 fixed thereto and extending rearwardly thereof in alignment with bore 251 and also slidably mounted upon shaft 232. The casting 250 extends to the left of shaft 232 (as viewed looking toward the rear of the machine) and terminates at its left in a half cylindrical bore 254 which extends slidably about the right half of shaft 231, so as to prevent any twisting of the casting. Longitudinally extending rack bar 260 extends slideably through a conforming notch 261 in the lower right of plate portion 201 and is coupled to a bottom yoke extension 262 of casting 250, by pin 262a, so that the forward and rearward movement of rack 260 controls the forward and rearward movement of casting 250.

Casting 250 also extends above the level of shafts 231 and 232 and has fixed to its right side a vertically extending bracket bar 265, by means of screws 266. The upper end of bracket 265, above the casting, is shaped to form a longitudinally extending collar 265a which receives turnably a hollow sleeve 267. Sleeve 267, which supports one reticle, has a rearward extension approximately two inches long, designated by the reference numeral 267a, this having longitudinally extending gear teeth 267b extending the full length thereof. In front, the sleeve 267 is held in place by means of washer 269 and retaining ring 269'.

For support of the other reticle, a vertically and laterally extending block 270 is located behind the casting 250, and is provided with a sleeve portion 271 which extends rearwardly thereof and which is mounted slidably upon shaft 231. At the other side, the block 270 is formed with a portion 272 which is shaped to clear shaft 232. A stationary longitudinal shaft 280 is fixed into a bore of casting 250, above the level of the shafts 231 and 232, and extends rearwardly thereof. Collar 281 is fixedly mounted upon shaft 280 and in turn extends through and is fixedly mounted in a through longitudinal bore of plate 270. Shaft 280 also supports relatively large circular gear 283, behind the plate 270, which meshes with the aforementioned gear 267a.

In order to couple casting 250 and block 270, screw 290 is provided. This screw 290 is hollow so as to receive shaft 291 extended through the bore thereof. Screw 290 has a central portion 290a which does not serve a screw function, and through which a lateral pin 292 is extended and against a flat 291x of shaft 291 to prevent relative turning of the two members although screw 290 is slidable relative to bar 291. Forwardly of the central portion 290a, the screw 290 has a portion 290b with a lefthand thread, which is received within a correspondingly threaded through bore 293 of casting 250. Finally, the rear portion 290c of screw 290 has a right hand thread and extends through a correspondingly threaded through bore 296 of block 270. The front end of shaft 291 is hollow and receives the rear of shaft 298 which extends turnably through block 201. Pin 297 locks shaft 298 to shaft 291. In front of block 201, gear 299 is mounted upon shaft 298. This gear meshes with a further gear 301 mounted upon a shaft 302 below shaft 298, this shaft 302 being turnably received within and through the plate 201.

From the foregoing, it will be apparent that longitudinal movement of rack 260 produces corresponding movement in unison of the two reticle support elements 250 and 270. On the other hand, rotary movement of shaft 291 produces longitudinal movement of the vertical support element 270 relative to the element 250.

Similarly to previous description, bracket plate 305 is fixed to the left side (as viewed from the front) of block 270, by means of screws 306. At its top, bracket 305 has a collar portion 307 which receives a sleeve 309, this having a gear portion 309a behind sleeve 307. The gear 309a is short, since it is fixed relative to the circular gear 283 with which it meshes. It will be apparent that the long gear 267b will always mesh with the gear 283 during any relative movement of the two reticles.

The lamp housing 42 has a longitudinally extending socket 43 which is supplied with current by means of leads 43a which are in turn connected to any suitable source of electric power not shown. Socket 43 is a conventional bayonet socket and receives a conventional frosted bayonet lamp 44 in the front thereof. This lamp 44 extends through a central opening of a reflector 45 which is supported within the housing by any suitable means and is shaped so as to reflect the light of the lamp through the rear of the respective bores 50 and 51. Conventional screw 46 or any other suitable means may be provided to hold the housing 42 releasably clamped upon the rear wall 41a of housing 41.

*Means for adjusting the reticles*

Frame 11 is hollow and has a lateral bore 70 in the left side of the housing, as viewed from the front (FIG. 8) and in which is contained a sleeve bearing or bushing 71. Sleeve 72 extends turnably through bushing 71. Shaft 73 extends turnably through sleeve 72 and also extends to the right thereof to be journaled within a bushing or bearing 74 which is received in a recess in the opposite side wall of frame housing 11. Outer knob or dial 75 of generally cylindrical and hollow shape has an inner boss 75a with a hollow bore in which the knurl 73a on shaft 73 is force fitted. Inwardly of dial 75, a further knob or dial 76 is fixedly mounted upon sleeve 72. Dial 76 is also hollow and has a central boss 76a with a bore into which sleeve 72 is force fitted. Dial disc 77 is turnably mounted on shaft 73 between knobs 75 and 76. Disc 77 has an ear 77a with a cutout 77b through which lateral screw 78a extends, this screw 78a being fixed into the side of frame 11 so as to prevent rotation of disc 77 (FIG. 9). Disc 77 is marked on its outer periphery with an index mark 77c which opposes scale 75c on the periphery of dial 75. Dial 75 carries an index mark 75d which opposes scale 76c on dial 76. Scales 75c and 76c are each graduated in diopter markings in both directions away from a zero mark (FIG. 10).

Shaft 73, near its right end, has fixedly mounted thereon a gear 78 with teeth 79 which mesh with the aforesaid longitudinal rack 260. Similarly, sleeve 72 has mounted thereon, within the interior of the hollow frame assembly 11, a bevel gear 303 which meshes with bevel gear 304 secured to the end of shaft 302. Rack 260 is located below the gear 78 and has the usual teeth on the upper edge thereof, meshing with the gear 78. For rack 260, block 82 is fixedly mounted within the interior of the frame assembly 11, on bottom bosses thereof. Said block 82 is of suitable shape so as to provide a suitable longitudinal slide bearing for the rack, as shown in FIGS. 8 and 9. As previously mentioned, rack 260 is also supported in notch 261 of element 201 and is coupled by pin 262a to casting 250, so that turning of dial 75 causes longitudinal movement of the two reticle support elements 250 and 270 in unison.

On the other hand, the shaft 302 is supported by bearing 302a attached to housing 11 and is journaled in plate 201. As previously discussed, the gear 301 on shaft 302 controls movement of element 270, so that turning of dial 76 causes relative movement of the two reticles.

Sometimes, as referred to above, it is necessary to rotate the reticles 32 and 33 so as to dispose the two hairlines angularly with respect to the horizontal and the vertical. This is done by means of the above-mentioned shaft 110 which extends through the housing 11 and which has a knob 111 on its front end. This shaft 110 extends through a bushing 112 placed in a bore in the front of the housing 11 (FIG. 9) and also through a clearance hole 113 in the rear of housing 11 (FIG. 9). Shaft 110 is journaled in an appropriate sleeve bearing 114 extending through a bore in the front wall of housing 41. Within the housing 41, gear 115 is fixedly mounted on shaft 110 and meshes with gear 116 which is fixedly mounted on shaft 117 which is supported on the front wall of housing 41.

Gear 410 is slidably connected by spline 117a to shaft 117 and meshes with gear 283, which as previously mentioned meshes with gears 267a and 309a. Accordingly, the turning of knob 111 causes rotation of reticles 32 and 33. Shaft 117 extends turnably through bearing opening 405 in block 270 and hence rearwardly and clearingly through bore 406 of boss 250.

Gear 116 meshes with gear 118, which is fixedly mounted on any suitable hub 400 which extends through the front wall housing 41 and is turnably mounted therethrough by means of bearing 41b. The front of hub 400 has a peripheral outstanding flange 400' which overlies the front of the housing 41. Gear 118 is fixed to the rear end of hub 400 by any suitable means. In addition, annular dial plate 119 is fixedly mounted coaxially upon gear 118, as clearly shown in FIG. 2, and is divided on its front face into a scale of 360 degrees designated by reference numeral 120 (FIG. 3). This scale 120 is visible above housing 40 through an opening 121 in the front wall of housing 41. A transparent plate 122 is mounted by screws 123 on the rear face of the front wall of housing 41 so as to overlie the opening thereof. Any suitable index marker 125a is fixed centrally to the housing so as to project downwardly below the top edge of the opening 121. Accordingly, a convenient gauge is provided for accurately determining the turned positions of the reticles.

*Summary of operation*

While the operation of the various parts will be clear from the foregoing detailed description, it will be helpful briefly to summarize the overall operation.

The lens to be tested may be clamped in its holder so that it may be viewed through the optical viewing system 13. The adjustments of this system are conventional and need not be discussed in detail. The light source is turned on, so that light is projected simultaneously through the two reticles 32a and 33a. As the result of the provision of the mirrors and prisms, the images of the hairlines on the respective reticles are projected along the longitudinal axis of the system, through the lens which is to be tested and hence into the viewing system.

The reticle 32a carries the horizontal hairline for measurement of spherical power of the lens. The knob 75 is first turned so as to move both reticles simultaneously, in the correct direction until the horizontal hairline of reticle 32a is in focus. The position of index 75d on scale 75c then determines the horizontal diopter of the lens. The dial 76 is then turned, moving only the vertical reticle 33a, until the vertical hairline thereof is in focus. The reading of index 77c upon scale 75c then determines the vertical diopter relative to the horizontal diopter. These readings can then be checked against the prescription to be certain that the lens is the correct one. Furthermore, the lens can be adjusted in position to be certain that its optical center lines up with the true optical center which is the intersection point of the horizontal and vertical hairlines. If desired, knob 111 may be manipulated so as to turn the two hairlines, and the term horizontal hairline and vertical hairline respectively include positions thereof turned from the horizontal and vertical, in accordance with the usual practice.

Once the lens has been located properly in position and tested to be certain that it corresponds to the prescription, the apparatus may be used to perform a desired grinding operation upon the lens.

While I have disclosed a preferred embodiment of my invention and have indicated various possible changes, omissions and additions which may be made therein, it will be apparent that various other changes, omissions and additions may be made in the invention without departing from the scope and spirit thereof.

What is claimed is:

1. Lens testing apparatus comprising means for supporting a lens and for viewing light projected from rear to front along a longitudinal axis through said lens, first and second reticles, means supporting said reticles behind said lens support means so that they extend transversely, are offset from said axis and from each other, are independently longitudinally movable in either front or rear direction and are turnable in unison, means behind said reticle support means for projecting light longitudinally forwardly through said reticles and said lens, the first reticle having a horizontal hairline for measurement of lens spherical power, the second reticle having a vertical hairline for measurement of lens cylinder power, optical means for shifting the reticle images to said axis to travel forwardly axially through said lens, whereby after longitudinal movement of one reticle into image focus position the second reticle can be moved into image focus condition with the image of the first reticle image meanwhile remaining in focus, and means for measuring the reticle positions for image focus condition relative to a selected standard position thereof.

2. System according to claim 1, said system also comprising means for moving said first and second reticles in unison.

3. System according to claim 2, the means for shifting the reticle images axially comprising first and second mirrors positioned respectively ahead of the first and second reticles and positioned to receive light from the respective reticles and direct such light laterally inwardly, the second mirror being located forwardly of the first mirror, and a prism system located laterally between said mirrors and having a rear reflecting surface positioned and adapted to receive the light from said first mirror and to direct it forwardly axially, said prism system having a front surface positioned and adapted to receive and pass therethrough the light from said first reflecting surface and further positioned and adapted to receive the light from said second mirror and to direct it axially forwardly.

References Cited by the Examiner

UNITED STATES PATENTS 1,542,112 6/1925 Tillyer _____ 88—56

FOREIGN PATENTS 893,990 4/1962 Great Britain.

JEWELL H. PEDERSEN, *Primary Examiner.*

T. L. HUDSON, *Assistant Examiner.*